(12) United States Patent
Tschambser et al.

(10) Patent No.: US 12,332,096 B2
(45) Date of Patent: Jun. 17, 2025

(54) MAGNETO-INDUCTIVE FLOW MEASUREMENT DEVICE

(71) Applicant: Endress+Hauser Flowtec AG, Reinach (CH)

(72) Inventors: Florent Tschambser, Hesingue (FR); Thomas Sulzer, Basel (CH); Andre Spahlinger, Bad Bellingen (DE); Thomas Bier, Riehe (CH)

(73) Assignee: Endress+Hauser Flowtec AG, Reinach (CH)

( * ) Notice: Subject to any disclaimer, the term of this patent is extended or adjusted under 35 U.S.C. 154(b) by 97 days.

(21) Appl. No.: 18/000,039

(22) PCT Filed: Apr. 23, 2021

(86) PCT No.: PCT/EP2021/060734
§ 371 (c)(1),
(2) Date: Nov. 28, 2022

(87) PCT Pub. No.: WO2021/239352
PCT Pub. Date: Dec. 2, 2021

(65) Prior Publication Data
US 2023/0204396 A1 Jun. 29, 2023

(30) Foreign Application Priority Data
May 29, 2020 (DE) .................. 10 2020 114 517.9

(51) Int. Cl.
*G01F 1/60* (2006.01)
*G01F 1/58* (2006.01)

(52) U.S. Cl.
CPC ............... *G01F 1/60* (2013.01); *G01F 1/586* (2013.01)

(58) Field of Classification Search
CPC .................................. G01F 1/60; G01F 1/586
See application file for complete search history.

(56) References Cited

U.S. PATENT DOCUMENTS

| 2006/0081067 | A1 | 4/2006 | Budmiger | |
| 2017/0234708 | A1* | 8/2017 | Xie | G01F 25/10 |
| | | | | 73/861.12 |

FOREIGN PATENT DOCUMENTS

| DE | 102013112373 A1 | 5/2015 |
| DE | 102015116771 A1 | 4/2017 |

(Continued)

OTHER PUBLICATIONS

English translation of DE 102016122495 A prior art document listed on IDS filed Nov. 28, 2022 (Year: 2018).*

*Primary Examiner* — Jonathan M Dunlap
*Assistant Examiner* — John M Royston
(74) *Attorney, Agent, or Firm* — Gil M. Repa; Endress+Hauser (USA) Holding, Inc.

(57) ABSTRACT

A magneto-inductive flow measurement device, comprises a means for producing a magnetic field with a self-inductance, wherein the means for producing the magnetic field comprises a coil arrangement; a means for sensing a measurement voltage induced in the flowable medium; an operating circuit, which is adapted to apply an operating signal on the coil arrangement, wherein the operating signal has operating signal parameters; a measuring circuit, which is adapted to determine a coil electrical current of the coil arrangement; a control circuit, which is adapted so to control at least one of the operating signal parameters that a function dependent on a self-induction value of the self-induction and a coil electrical current value of the coil electrical current does not differ from a predetermined, first desired value.

12 Claims, 3 Drawing Sheets

(56) References Cited

FOREIGN PATENT DOCUMENTS

| | | | |
|---|---|---|---|
| DE | 102016122495 | A1 | 5/2018 |
| EP | 0892251 | A1 | 1/1999 |
| EP | 1260797 | A2 | 11/2002 |
| WO | 2014001026 | A1 | 1/2014 |

* cited by examiner

MAGNETO-INDUCTIVE FLOW MEASUREMENT DEVICE

CROSS-REFERENCE TO RELATED APPLICATIONS

The present application is related to and claims the priority benefit of DPMA Patent Application No. 10 2020 114 517.9, filed on May 29, 2020 and International Patent Application No. PCT/EP2021/060734, filed on Apr. 23, 2021, the entire contents of which are incorporated herein by reference.

TECHNICAL FIELD

The invention relates to a magneto-inductive flow measurement device for ascertaining a flow velocity dependent, measured variable of a flowable medium.

BACKGROUND

Magneto-inductive flow measurement devices are applied for determining flow velocity and volume flow of a flowing medium in a pipeline. In such case, inline magneto-inductive, flow measurement apparatuses are distinguished from magneto-inductive, flow measuring probes, which are inserted into a lateral opening of a pipeline. A magneto-inductive flow measurement apparatus includes a means for producing a magnetic field extending perpendicularly to the flow direction of the flowing medium. Used for such purpose are usually individual coils. In order to implement a predominantly uniform magnetic field, supplementally, pole shoes are so formed and placed that the magnetic field lines extend essentially perpendicularly to the transverse axis and in parallel with the vertical axis of the measuring tube over the entire tube cross section. Additionally, a magneto-inductive flow measurement apparatus includes a measuring tube, on which the means for producing the magnetic field is arranged. A measuring electrode pair mounted on the lateral surface of the measuring tube senses, perpendicularly to the flow direction and to the magnetic field, an electrical measurement voltage, or potential difference, which occurs, when a conductive medium flows in the flow direction in the presence of applied magnetic field. Since the registered measurement voltage depends according to Faraday's law of induction on the velocity of the flowing medium, flow velocity and—with incorporation of a known tube cross section—volume flow can be ascertained from the induced measurement voltage.

In contrast with a magneto-inductive flow measurement apparatus, which includes a measuring tube for conveying the medium, means for producing a magnetic field passing through the measuring tube and measuring electrodes, magneto-inductive, flow measuring probes are inserted with a usually circularly cylindrical housing into a lateral opening of a pipeline and secured there fluid-tightly. A special measuring tube is no longer necessary. The above mentioned measuring electrode arrangement and coil arrangement mounted on the lateral surface of the measuring tube are absent and replaced by a means for producing a magnetic field arranged in the interior of the housing and in the immediate near field of the measuring electrodes. The means for producing a magnetic field is so embodied that a symmetry axis of the magnetic field lines of the produced magnetic field intersects the front area, or the area between the measuring electrodes, perpendicularly. A number of different magneto-inductive, flow measuring probes are known in the state of the art.

Magneto-inductive flow measurement devices are widely used in process and automation technology for measuring fluids having an electrical conductivity of at least about 5 µS/cm. Corresponding flow measurement devices are sold by the applicant in a wide variety of forms of embodiment for various fields of application, for example, devices bearing the mark PROMAG or the mark MAGPHANT.

There are a number of different methods for controlling the operating signal imposed on the coil arrangement. These have, as a rule, the goal of producing a magnetic field with a magnetic induction as constant as possible over an entire measuring phase. Thus, for example, in WO 2014/001026 A1, a control unit is taught, in the case of which a voltage signal applied on the coil arrangement is controlled in such a manner that a coil electrical current flowing through the coil arrangement in a certain measuring phase reaches and maintains a coil electrical current desired value. The coil electrical current flowing through the coil arrangement produces a magnetic field having a magnetic induction dependent on the coil electrical current. In such case, it is basically assumed that by establishing a fixed coil electrical current desired value then also the magnetic induction of the produced magnetic field assumes a desired reproducible value. Advantageous in the case of such a control is that the control manages without having to measure the magnetic induction. It has, however, been found that—because of temperature changes and magnetic disturbance fields—the magnetic induction cannot be made reproducible alone by control based on a fixed coil electrical current desired value. Thus, the value assumed for the magnetic induction for ascertaining the flow velocity dependent, measured variable may differ from the actual magnetic induction in the measuring tube. Depending on the disturbing variable, such can lead to deviations of up to 20% in the ascertaining of the flow velocity dependent, measured variable.

SUMMARY

An object of the invention is to provide a remedy for this problem.

The object is achieved by the magneto-inductive flow measurement device as claimed.

The magneto-inductive flow measurement device of the invention for ascertaining a flow velocity dependent, measured variable of a flowable medium comprises:
a means serving for producing a magnetic field and having a self-inductance,
 wherein the means for producing the magnetic field comprises a coil arrangement;
a means for sensing a measurement voltage induced in the flowable medium, especially at least two preferably diametrically arranged measuring electrodes;
an operating circuit, which is adapted to apply an operating signal, especially a voltage signal, on the coil arrangement,
 wherein the operating signal has operating signal parameters;
a measuring circuit, which is adapted to determine a coil electrical current of the coil arrangement;
a control circuit, which is adapted so to control one of the operating signal parameters that a function dependent on a self-induction value of the self-induction and a coil electrical current value of the coil electrical current does not differ from a predetermined, first desired value.

Magneto-inductive flow measurement devices having such a control circuit have a greater insensitivity to external disturbance fields. The control circuit of the invention is especially advantageous for use in magneto-inductive flow measurement devices supplied via electrochemical storage. Such are operated with a significantly lower electrical current, and a significantly lower voltage, than conventional magneto-inductive flow measurement devices supplied via a grid. That leads to the fact that the field guide components in use do not transfer into a magnetic saturation. In order that such have supplementally to an especially increased sensitivity with regard to external disturbance fields also a lengthened transient time upon start-up, wherein the transient time is the duration, which must be waited after operating the flow measurement device, until the means for producing the magnetic field warms up and the magnetic induction settles toward the desired value. Magneto-inductive flow measurement devices with the control circuit of the invention have, additionally, a significantly lower temperature coefficient of the magnetic field, wherein the temperature coefficient describes the deviation of the magnetic field per temperature change.

The factory- or start-up ascertained and provided, first desired value can be determined in an adjusting procedure or by a computer simulation.

Advantageous embodiments of the invention are set forth in the dependent claims.

An embodiment provides that the function depends on a product of the self-induction value and the coil electrical current value.

The sensitivity of the magneto-inductive flow measurement device relative to disturbance fields and temperature influences is reduced by the control of the one operating signal parameter as a function of the function dependent on the self-induction value and the coil electrical current value. A further reduction of the sensitivity can be achieved by so selecting the function that it depends on a product of the self-induction value and the coil electrical current value. In an embodiment, the function depends exclusively on the product of the self-induction value and the coil electrical current.

An embodiment provides that the operating signal is a voltage applied over time, especially with a voltage curve varying as a function of time, wherein the voltage curve is divided into time intervals, wherein a sign of the voltage curve alternates in successive time intervals, wherein the time intervals include, in each case, a first subinterval, in which a first voltage, especially a first voltage constant over the entire first subinterval, is applied on the means for producing the magnetic field.

An embodiment provides that the measuring circuit is adapted to measure the coil electrical current value during the first subinterval, wherein the controlled operating signal parameter comprises a function dependent on the first voltage or is the first voltage.

Depending on the coil electrical current value ascertained in the first time interval, a time constant can be ascertained, which is a characteristic variable and which depends at least on an electrical resistance and on the self-induction of the means for producing the magnetic field. In ascertaining the time constant, a single coil electrical current value, at least two coil electrical current values or a coil electrical current value function of time formed by coil electrical current values can be used, wherein a time value is associated with each coil electrical current value.

The control circuit is adapted so to control the first voltage that a control function dependent on the ascertained time constant and the first voltage, or the function dependent on the first voltage, does not differ from a predetermined, desired value. In an advantageous embodiment, the above introduced function depends especially exclusively on the product of the time constant and the first voltage, or the function dependent on the first voltage. The time constant characterizes the rise of the coil electrical current. Thus, the time constant can, for example, be so established that it describes the duration after the switching of the coil electrical current direction, until the coil electrical current reaches a predetermined, desired coil electrical current value. The time constant depends on external magnetic fields and on changes of the electrical coil resistance.

The time constant can be ascertained from the rise of the coil electrical current after the applying, or switching, of the coil voltage. For such purpose, for example, the, as a rule, non-linear coil electrical current as a function of time after the change of the coil voltage can be fitted with a fit function and, taking into consideration the electrical coil resistance and the coil voltage, the time constant determined. The fit function includes, in such case, an exponential function, with an exponent having the time constant. Alternatively, the duration can be ascertained that is required for the coil electrical current to reach a predetermined coil electrical current desired value and the time constant determined as a function of this duration. The product of the time constant and the first voltage equals the product of the self-induction and the coil electrical current. Therefore, as a function of the ascertained time constant, the first voltage is so controlled that a product of the time constant and the first voltage is constant.

An embodiment provides that the time intervals have, in each case, a second subinterval, in which a second voltage, especially a second voltage constant over the second subinterval, is applied on the means for producing the magnetic field, wherein the second voltage is greater than the first voltage, wherein in the voltage curve the first subinterval follows the second subinterval, wherein a duration of the second subinterval is shorter than a duration of the first subinterval.

An embodiment provides that a quotient of the first voltage and the second voltage is constant over the voltage curve, wherein the controlled operating signal parameter comprises the duration of the second subinterval and a function dependent on the first voltage, wherein the duration of the second subinterval is a changeable and controllable variable, wherein the control circuit is adapted so to control the duration of the second subinterval and the function dependent on the first voltage that a control function does not differ from a predetermined, second desired value, wherein the control function depends on a product of the duration of the second subinterval and the function dependent on the first voltage.

By fixing the quotient of the first voltage and the second voltage, a simplified control is obtained. Reduction of the sensitivity to disturbance fields and temperature influences could be achieved by establishing the function dependent on the product of the duration of the second subinterval and the first voltage as operating signal parameter. Especially, by controlling the variable and controllable duration of the second subinterval and the first voltage, or the function dependent on the first voltage, such that the product of the two parameters is constant, a magneto-inductive, flow measurement device with especially high insensitivity and fast reaction time could be achieved. Additionally, a continuous monitoring of the self-induction is not necessary. It has been found that by the embodiment of the invention, in the case of which the function dependent on the product of the duration of the second subinterval and the first voltage is kept constant, also the function dependent on the self-induction value of the self-induction and the coil electrical current value of the coil electrical current, or their product, remains constant. Since the quotient of the first voltage and the second voltage is constant, the function dependent on the first voltage can be set equal to a function dependent on the second voltage.

In such case, the second desired value can be a variable dependent on the first desired value or equal the first desired value.

The control circuit is adapted so to control the duration of the second subinterval that at a set point in time—for example, the beginning of the measuring phase, in which the induced measurement voltage is determined—or in a time segment, the deviation of a test quantity from a test desired value is minimum. The test quantity can be a measured value of the coil electrical current, a sum, or an integral, over a curve of the coil electrical current or a function dependent on the coil electrical current. In such case, the test desired value for the different subintervals can vary. Alternatively, the control circuit can be embodied and adapted so to control the duration of the second subinterval that a duration of a transient of the coil electrical current after the beginning of the first subinterval is minimum.

An embodiment provides that the function dependent on the first voltage is inversely proportional to the duration of the second subinterval.

Such can be achieved by simultaneously controlling the duration of the second subinterval and the control of the first voltage.

An embodiment provides that the second voltage is constant during the time intervals,
wherein the at least one controlled operating signal parameter comprises the duration of the second subinterval and a function dependent on the first voltage,
wherein the duration of the second subinterval and the function dependent on the first voltage are so controlled that a control function does not differ from a predetermined, second desired value,
wherein the control function depends on a product of the function dependent on the first voltage and the duration of the second subinterval.

Additionally, the control function can depend on a maximum coil electrical current value of the second subinterval and a coil electrical current value ascertained during the first subinterval.

The control circuit is adapted so to control the duration of the second subinterval and the first voltage, or the function dependent on the first voltage, that the control function does not differ from a predetermined, second desired value. Thus, it is achieved that also the function dependent on the self-induction value of the self-induction and the coil electrical current value of the coil electrical current, or on their product, assumes the predetermined, second desired value in the measuring phase.

An embodiment provides that the coil electrical current assumes a maximum coil electrical current value in the second subinterval,
wherein a value of a quotient of the maximum coil electrical current value and a coil electrical current value ascertained during the first subinterval is constant over the operating signal.

This embodiment simplifies the control, since supplementally to the constant second voltage, the quotient of the maximum coil electrical current value and the coil electrical current value ascertained during the first subinterval is kept constant. For such purpose, the coil electrical current is ascertained via a measuring circuit and provided to the control circuit.

An embodiment provides that a coil electrical current assumes in the time interval, especially in the first subinterval, a maximum coil electrical current value,
wherein the at least one controlled operating signal parameter comprises the duration of the second subinterval and a function dependent on the first voltage and the maximum coil electrical current value,
wherein the control circuit is adapted so to control the duration of the second subinterval and the function dependent on the first voltage that a control function does not differ from a second desired value,
wherein the control function depends on a product of the duration of the second subinterval and the function dependent on the first voltage and the maximum coil electrical current value.

An embodiment provides that the magneto-inductive flow measurement device comprises:
an evaluation circuit, which is adapted to ascertain an actual value of a function dependent on the self-induction value.

Thus, it can be checked, whether the function dependent on the self-induction value of the self-induction and the coil electrical current value of the coil electrical current does not differ from a predetermined, first desired value.

The actual value of the function dependent on the self-induction value can be ascertained, for example, from the slope of the coil electrical current curve around the coil electrical current zero point. In that case, the electrical resistance is approximately zero and thermal influences are negligible. In order to prevent influencing by eddy currents, the actual value of the function dependent on the self-induction value can be ascertained in a time segment, in which the coil electrical current overshoots and, thereafter, decreases because of the reversing and the change of the coil voltage. During the overshoot, the temporal change of the eddy currents is small.

The function dependent on the self-induction value can be, for example, the self-induction of the means for producing the magnetic field.

An embodiment provides that the control circuit is adapted, in the case of a deviation of the actual value from the first desired value in a time interval $t_N$, so to change the second voltage that a deviation from the first desired value is less in a time interval $t_{N+M}$ following thereon,
wherein N is a natural number and M≥1, especially M=1 or M=2.

An embodiment provides that the control circuit is adapted, in the case of a deviation of the actual value of the first desired value in a time interval $t_N$, so to change the first voltage that the deviation from the first desired value is less in a time interval $t_{N+M}$ following thereon,
wherein N is a natural number and M≥1, especially M=1 or M=2.

An embodiment provides that the control circuit is adapted, in the case of a deviation of the actual value from the first desired value in a time interval $t_N$, so to change a quotient of the first voltage and the second voltage that the deviation is less in a time interval $t_{N+M}$ following thereon, wherein N a natural number is and M≥1, especially M=1 or M=2.

An embodiment provides that the control circuit is adapted, in the case of a deviation of a coil test electrical current value or a test quantity dependent on the coil test electrical current value from the first desired value in a time interval $t_N$, so to change the duration of the second time interval that the deviation is less in a time interval $t_{N+M}$ following thereon, wherein N is a natural number and M≥1, especially M=1 or M=2.

An embodiment provides that the magneto-inductive flow measurement device is embodied as a magneto-inductive flow measurement apparatus comprising a measuring tube for conveying the flowable medium.

An embodiment provides that the magneto-inductive flow measurement device is embodied as a magneto-inductive flow measuring probe for introduction into a lateral opening of a pipeline, comprising a housing to be exposed to the medium.

BRIEF DESCRIPTION OF THE DRAWINGS

The invention will now be explained in greater detail based on the appended drawing, the figures of which show as follows.

DETAILED DESCRIPTION

Figure 1:
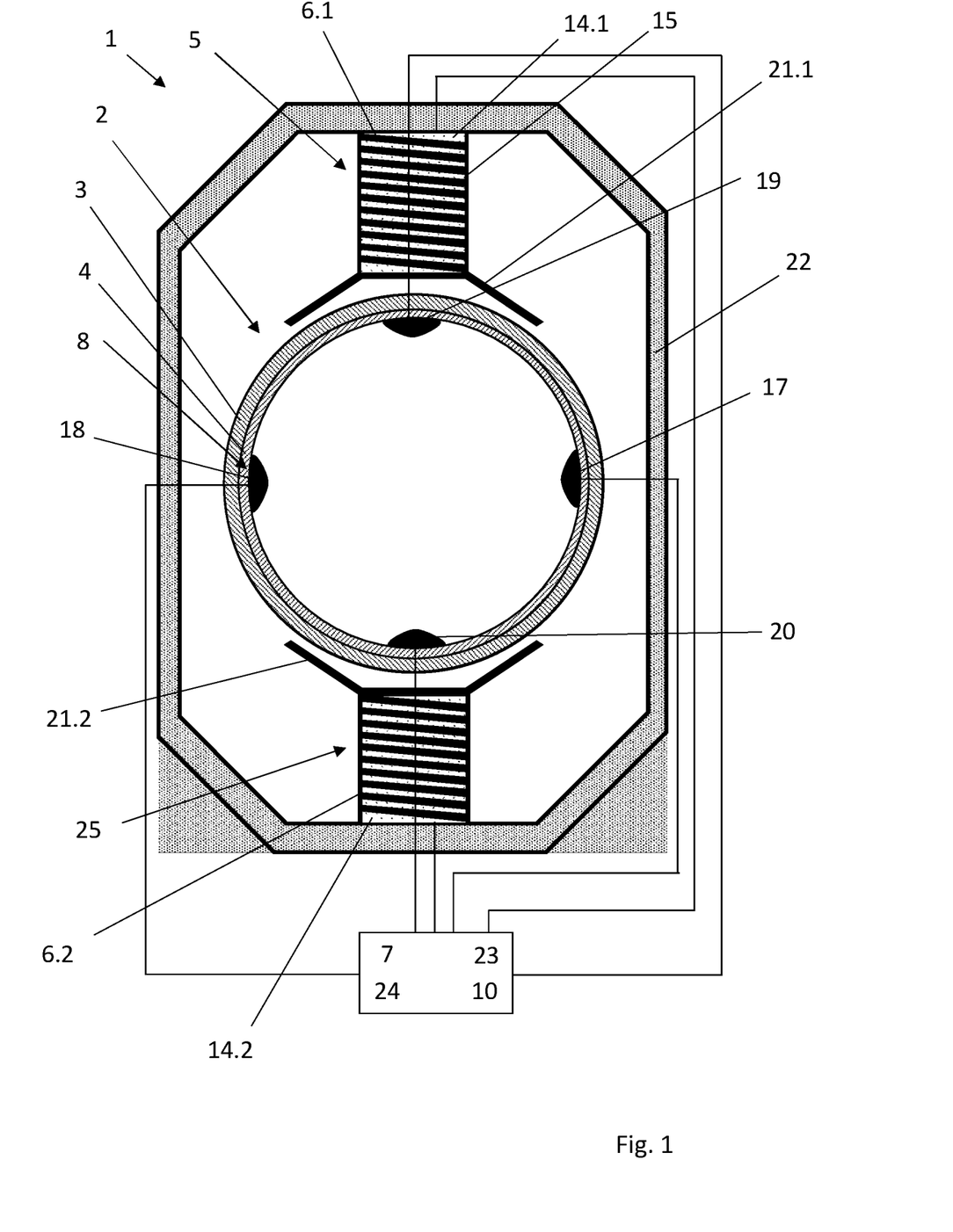
FIG. 1 shows an embodiment of the magneto-inductive flow measurement apparatus of the present disclosure.

FIG. 1 shows a cross section of an embodiment of the magneto-inductive flow measurement apparatus 1 of the invention. The construction and the measuring principle of a magneto-inductive flow measurement apparatus 1 are basically known. Conveyed through measuring tube 2 is a flowable medium, which has an electrical conductivity. The measuring tube 2 includes a support tube 3, which is usually formed of steel, ceramic, plastic or glass or at least comprises these. A means 5 for producing a magnetic field is then arranged at the support tube 3 such that the magnetic field lines orient essentially perpendicularly to a longitudinal direction defined by a measuring tube axis. The means 5 for producing the magnetic field comprises a saddle coil or a coil 6. Extending through a receptacle 15 of the coil 6 is usually a coil core 14. The term, receptacle, means the volume bounded by the coil wire forming the coil 6. The receptacle 15 of the coil 6 can, thus, be formed by a coil support or the imaginary enclosed volume. The latter case occurs when the coil wire of the coil 6 is wound directly around the coil core 14. The coil core 14 is formed of a magnetically conductive, especially soft magnetic material.

The means 5 for producing the magnetic field includes a pole shoe 21, which is arranged on an end of the coil core 14. The pole shoe 21 can be a separate component or monolithically connected with the coil core 14. In the embodiment of FIG. 1, coil 6 is split into two diametrically arranged coils 6.1, 6.2 having, in each case, a coil core 14.1, 14.2 and a pole shoe 21.1, 21.2. The two coil cores 14.1, 14.2 are connected together via a field guideback 22. The field guideback 22 connects the far ends of the coil cores 14.1, 14.2 with one another. There are, however, also magneto-inductive, flow measurement apparatuses with just one coil and one coil core and lacking a field guideback. Coil 6 is connected with an operating circuit 7, which drives the coil 6 with an operating signal. The operating signal can be a voltage varying as a function of time and is characterized by operating signal parameters, wherein at least one of the operating signal parameters is controllable. The magnetic field formed by the means 5 for producing the magnetic field is produced by a direct current of alternating polarity. The polarity changes are produced by means of the operating circuit 7. This type of operation assures a stable zero point and makes the measuring insensitive to influence by electrochemical effects. The two coils 6.1, 6.2 can be connected separately with the operating circuit 7 or in series, or in parallel, with one another.

In the case of applied magnetic field, there occurs in the measuring tube 2 a flow dependent potential distribution, which can be registered, for example, in the form of an induced measurement voltage. A means 8 for sensing the induced measurement voltage is arranged on the measuring tube 2. In the shown embodiment, the means 8 for sensing the induced measurement voltage is formed by two oppositely arranged measuring electrodes 17, 18 having galvanic contact with the medium. There are, however, also magneto-inductive, flow measurement apparatuses known, which have measuring electrodes arranged on the exterior of the support tube 3 and not in contact with the medium. As a rule, the measuring electrodes 17, 18 are diametrically arranged and form an electrode axis (or are intersected by a transverse axis), which extends perpendicularly to the magnetic field lines and to the longitudinal axis of the measuring tube 2. There are, however, also means 8 for sensing the induced measurement voltage known, which have more than two measuring electrodes. Based on the measured voltage, the flow velocity dependent, measured variable can be determined. The flow velocity dependent, measured variable comprises the flow velocity, the volume flow and/or the mass flow of the medium. A measuring circuit 23 is adapted to register the induced measurement voltage lying between the measuring electrodes 17, 18, and an evaluation circuit 24 is embodied to ascertain the flow velocity dependent, measured variable.

Support tube 3 is frequently formed of an electrically conductive material, such as e.g. steel. In order to prevent loss of the measurement voltage lying between the first and second measuring electrodes 17, 18 via the support tube 3, its interior is lined with an insulating material, for example, a (plastic-)liner 4.

Usual magneto-inductive, flow measurement devices have, supplementally to the measuring electrodes 17, 18, two other electrodes 19, 20. On the one hand, a fill level monitoring electrode 19 placed optimally at the highest point in the measuring tube 2 serves to indicate a partial filling of the measuring tube 1, and is adapted to forward this information to the user and/or to take such the fill level into consideration in ascertaining volume flow. Furthermore, a reference electrode 20, which is usually mounted diametrically opposite the fill level monitoring electrode 19, or at the lowest point of the measuring tube cross section, serves to set a controlled, electrical potential in the medium. As a rule, the reference electrode 20 is applied for connecting the flowing medium to a ground, or earth, potential.

The operating circuit 7, control circuit 10, measuring circuit 23 and evaluation circuit 24 can be part of a single electronic circuit, or form individual circuits.

Figure 2:
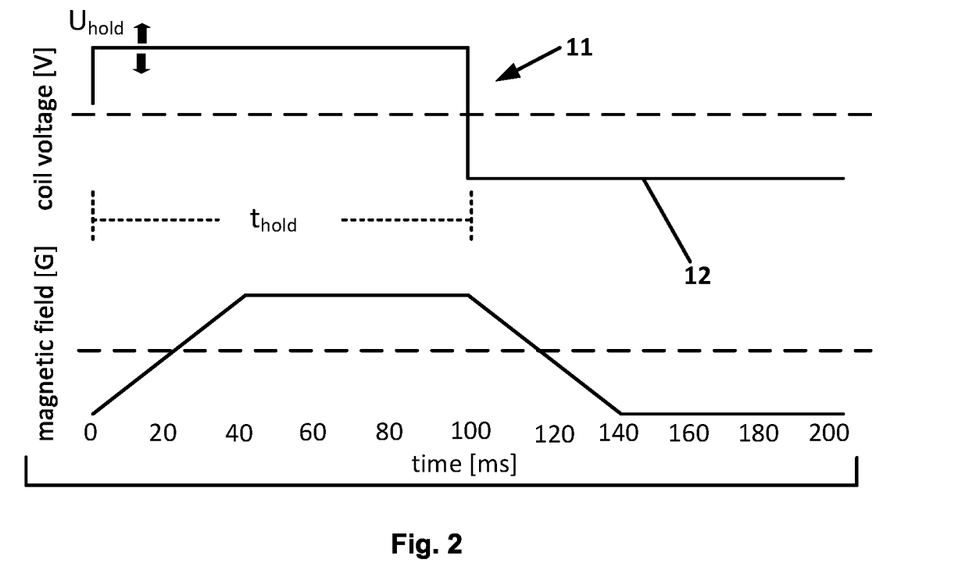
FIG. 2 shows a first embodiment of the voltage curve and the magnetic field correspondingly produced by the coil arrangement.
Figure 3:
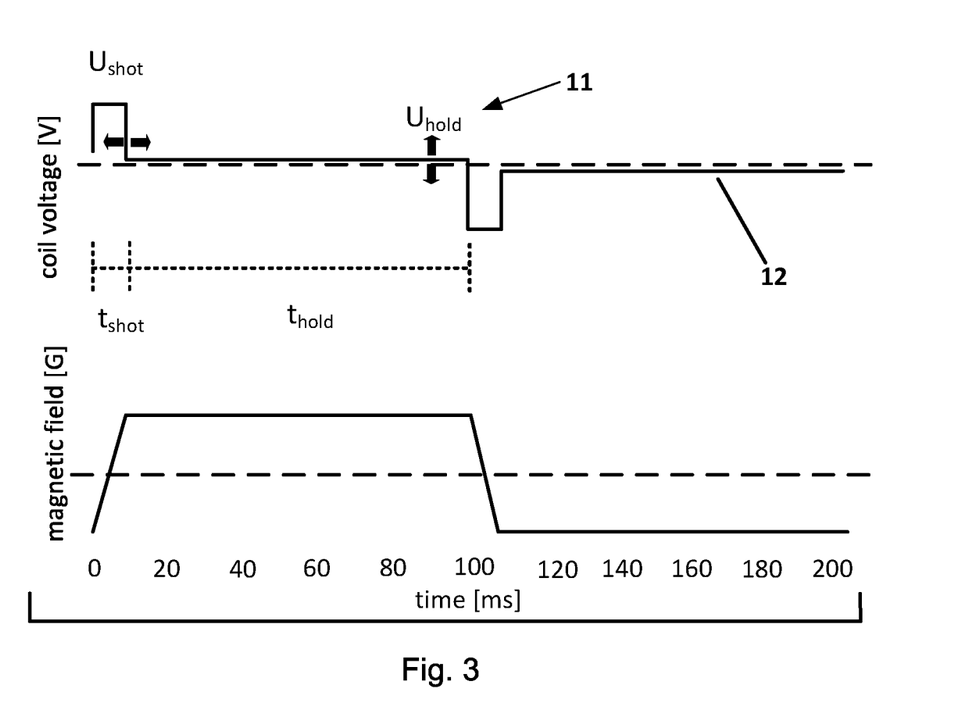
FIG. 3 shows a second embodiment of the voltage curve and the magnetic field correspondingly produced by the coil arrangement.

Operating circuit 7 is adapted to apply to the coil arrangement a first voltage for a first subinterval and a second voltage fora second subinterval. In such case, the second voltage is greater than the first voltage. Additionally, in a time interval, the first subinterval follows the second subinterval. The duration of the first subinterval is greater than the duration of the second subinterval. The duration of the second subinterval is controllable, as is the first voltage. FIGS. 2 and 3 show possible embodiments of the operating signal.

According to the invention, control circuit 10 is adapted so to control one of the operating signal parameters of the operating signal that a function dependent on the self-induction value of the self-induction and the coil electrical current value of the coil electrical current does not differ from a predetermined, first desired value. The control circuit 10 is preferably adapted so to control one of the operating signal parameters that a product of the self-induction value and the coil electrical current value does not differ from a predetermined, first desired value. For such purpose, the first voltage and the duration of the second subinterval are so controlled that a variable dependent on the first voltage and the duration of the second subinterval does not differ from a second desired value. If a deviation occurs—because of magnetic disturbance fields or temperature influences—the two control parameters are so adapted, until the deviation is again minimal.

FIG. 2 shows a first embodiment of the operating signal and the correspondingly produced magnetic field through the coil. The operating signal comprises according to the invention a voltage having a time variable curve 12, which is divided into time intervals t. The sign of the applied voltage changes in successive time intervals t. The operating signal shown in FIG. 2 includes time intervals t, which have, in each case, a first subinterval $t_{hold}$, in which a constant first voltage $U_{hold}$ is applied on the coil over the entire duration of the first subinterval $t_{hold}$. The registered measurement voltage induced for ascertaining the flow velocity dependent, measured variable is ascertained in the first subinterval $t_{hold}$. In the first embodiment, the control circuit is adapted so to control the first voltage $U_{hold}$ of a time interval t that a function dependent on a self-induction value of the self-induction L and a coil electrical current value of the coil electrical current I, especially a function dependent on a product of the two values, does not differ from a predetermined, first desired value. The first voltage $U_{hold}$ according to the invention is time variable and of controllable size. The rise of the coil electrical current is characterized by a time constant, which is ascertainable via a measuring circuit. The first voltage $U_{hold}$ can be so controlled that a variable dependent on the product of the time constant and the first voltage $U_{hold}$ does not differ from a predetermined, second desired value.

FIG. 3 shows a second embodiment of the operating signal and the magnetic field produced by the means for producing the magnetic field. The operating signal comprises according to the invention a voltage having a time variable curve 12, which is divided into time intervals t. The sign of the applied voltage changes in successive time intervals t. The operating signal shown in FIG. 2 comprises time intervals t, which have, in each case, a first subinterval $t_{hold}$, in which a constant first voltage $U_{hold}$ is applied on the coil over the entire duration of the first subinterval $t_{hold}$. The registered measurement voltage induced for ascertaining the flow velocity dependent, measured variable is ascertained in the first subinterval $t_{hold}$. Additionally, the time intervals t have, in each case, a second subinterval $t_{shot}$, in which a second voltage $U_{shot}$, especially one constant over the entire duration of the second subinterval $t_{shot}$, is applied on the coil. In such case, the second voltage $U_{shot}$ is greater than the first voltage $U_{hold}$. In the voltage curve, the first subinterval $t_{hold}$ follows the second subinterval $t_{shot}$. Additionally, the duration of the second subinterval $t_{shot}$ is less than the duration of the first subinterval $t_{hold}$. The duration of the second subinterval $t_{shot}$ is time variable and controllable, as is the first voltage $U_{hold}$.

The first voltage $U_{hold}$ and the second voltage $U_{shot}$ can be so set that a ratio between the first voltage $U_{hold}$ and the second voltage $U_{shot}$ is constant over the total curve 12. This means that by controlling the first voltage $U_{hold}$ automatically also the second voltage $U_{shot}$ is adapted proportionally to the change. Alternatively, the second voltage $U_{shot}$ can have a constant value over the total curve 12. Besides controlling the first voltage $U_{hold}$, the duration of the second subinterval $t_{shot}$ is so controlled that an ascertained value of a variable dependent on a test quantity assumes a test desired value within the duration of the second subinterval $t_{shot}$. In such case, the variable can be, for example, a sum or an integral of the measured values of the test quantity for a predetermined time section. In such case, the two control parameters are so controlled that a function dependent on the product of the first voltage $U_{hold}$ and the duration of the second subinterval $t_{shot}$ does not differ from a predetermined, second desired value. The function dependent on the first voltage $U_{hold}$ is inversely proportional to the duration of the second subinterval $t_{shot}$. The test quantity can be a measured value of the coil electrical current, coil electrical current as a function of time and/or a variable dependent thereon.

The control circuit is adapted in the case of a deviation of a coil test electrical current value or a test quantity dependent on the coil test electrical current value from a desired value in a time interval $t_N$ so to change the duration of the second subinterval $t_{shot}$ that the deviation is smaller in a time interval $t_{N+M}$ following thereon, wherein M≥1. At the same time, the control circuit is adapted, in the case of a deviation of the actual value from a desired value in a time interval $t_N$, so to change the first voltage $U_{hold}$ that the deviation from a desired value is smaller in a time interval $t_{N+M}$ following thereon, wherein M≥1. In such case, however, at least one of the above listed conditions should be fulfilled. The control circuit can additionally be adapted to control other variables and/or functions.

In an additional embodiment, a measuring circuit is adapted to ascertain in the first subinterval $t_{hold}$ a maximum coil electrical current value $I_{max}$ and the function dependent on the duration of the second subinterval $t_{shot}$ and the first voltage $U_{hold}$ are so controlled that a control function does not differ from a predetermined, second desired value, wherein the control function depends on a product of the duration of the second subinterval $t_{shot}$ and the function dependent on the first voltage $U_{hold}$ and the maximum coil electrical current value $I_{max}$.

Alternatively, the control circuit can be adapted so to control at least one of the operating signal parameters that a value of a quotient of the maximum coil electrical current value $I_{max}$ and a coil electrical current value $I_{hold}$ ascertained during the first subinterval $t_{hold}$ is constant over the operating signal.

The two curves shown in FIG. 3 are greatly simplified. As a rule, a transient behavior of the magnetic field occurs after the second subinterval.

Figure 4:
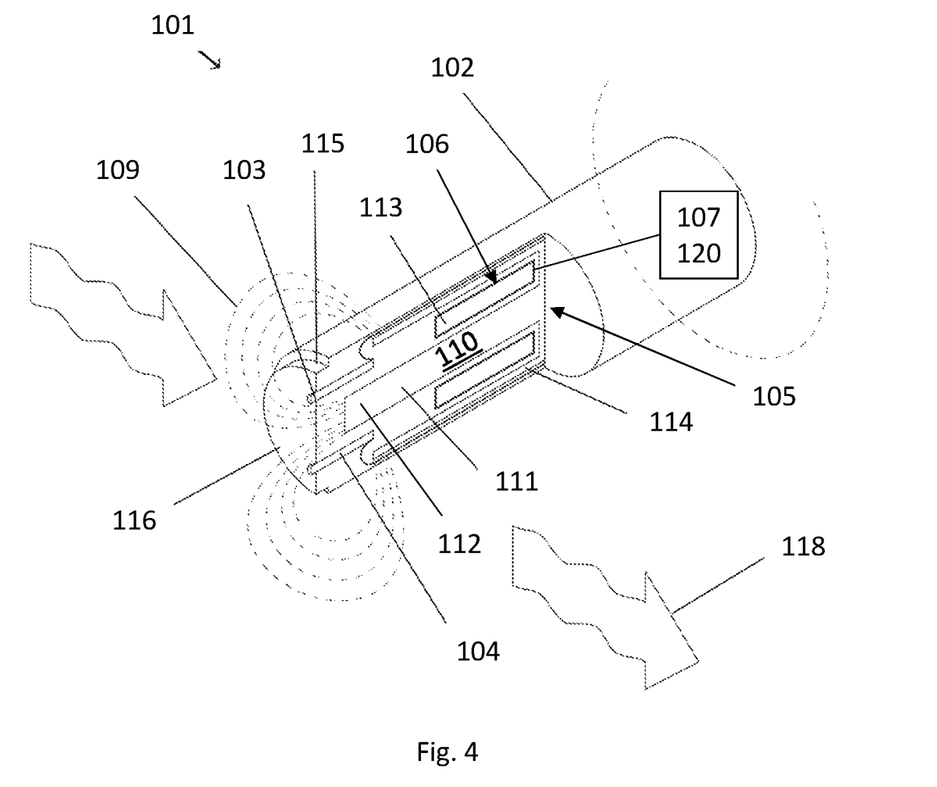
FIG. 4 shows a perspective view of a partiality sectioned embodiment of a magneto-inductive flow measuring probe of the present disclosure.

Based on the perspective and partiality sectioned view of FIG. 4, firstly, the measuring principle underlying the invention will be explained. The illustrated flow measuring probe 101 has a basically circularly cylindrical housing 102 having a predetermined outer diameter. Such is chosen to fit the diameter of a bore located in a wall of a pipeline (not shown). The flow measuring probe 101 is plugged fluid-tightly into the bore. A medium to be measured flows in the pipeline. The flow measuring probe 101 is immersed basically perpendicularly to the flow direction of the medium shown by the wavy arrow 118. A front end 116 of the housing 102 protruding into the medium is fluid-tightly sealed with a front body 115 of insulating material. By means of a coil arrangement 106 arranged in the housing 102, a magnetic field 109 passing through the end section and into medium can be produced. A coil core 111 at least partially of a soft magnetic material and arranged in the housing 102 ends at or in the vicinity of the end section 116. A field guideback means 114, which surrounds the coil arrangement 106 and the coil core 111, is adapted to bring the magnetic field 109 leaving the end section back into the housing 102. The coil core 111, the pole shoe 112 and the field guideback means 114 are field guiding bodies 110, which together form a field guiding arrangement 105. First and second measuring electrodes 103, 104 forming a galvanic contact with the conveyed medium form the means for registering a measurement voltage induced in the medium and are arranged in the front body 115 and contact the medium like the external walls of the housing. An electrical voltage induced based on Faraday's law of induction and sensed on the measuring electrodes 103, 104 can be can be read by a measuring- and/or evaluation unit. The induced voltage is maximum, when the flow measuring probe 101 is so installed in the pipeline that a plane defined by a straight line intersecting the two measuring electrodes 103, 104 and a longitudinal axis of the flow measuring probe extends perpendicularly to the flow direction 118, or longitudinal axis of the pipeline. An operating circuit 107 is electrically connected with the coil arrangement 106, especially with the coil 113, and is adapted to apply the operating signal on the coil 113, in order to produce the reversing magnetic field 109. The control circuit 120 is adapted so to control at least one of the operating signal parameters of the operating signal that a function dependent on a self-induction value of the self-induction and a coil electrical current value of the coil electrical current does not differ from a predetermined, desired value. For such purpose, according to an embodiment, the function dependent on the first voltage $U_{hold}$ and the duration of the second subinterval $t_{shot}$ are so controlled that the two are inversely proportional to one another.

The invention claimed is:

1. A magneto-inductive flow measurement device for ascertaining a flow velocity dependent, measured variable of a flowable medium, the magneto-inductive flow measurement device comprising:
   a means for producing a magnetic field having a self-inductance, wherein the means for producing the magnetic field includes a coil arrangement;
   a means for sensing a measurement voltage induced in the flowable medium, wherein the means for sensing the measurement voltage includes at least two diametrically arranged measuring electrodes;
   an operating circuit adapted to apply an operating signal on the coil arrangement, wherein the operating signal has operating signal parameters;
   a measuring circuit adapted to determine a coil electrical current of the coil arrangement; and
   a control circuit adapted to control at least one of the operating signal parameters so that a function dependent on a self-induction value of the self-induction and a coil electrical current value of the coil electrical current does not differ from a predetermined, first desired value, wherein the function depends on a product of the self-induction value and the coil electrical current value.

2. The magneto-inductive flow measurement device as claimed in claim 1, further comprising:
   an evaluation circuit is adapted to ascertain an actual value of a function dependent on the self-induction value.

3. The magneto-inductive flow measurement device as claimed in claim 1, further comprising:
   a measuring tube for conveying the flowable medium,
   wherein the magneto-inductive flow measurement device is embodied as a magneto-inductive flow measurement apparatus.

4. The magneto-inductive flow measurement device as claimed in claim 1, further comprising:
   a housing embodied to be exposed to the medium,
   wherein the magneto-inductive flow measurement device is embodied as a magneto-inductive flow measuring probe for introduction into a lateral opening of a pipeline.

5. A magneto-inductive flow measurement device for ascertaining a flow velocity dependent, measured variable of a flowable medium, the magneto-inductive flow measurement device comprising:
   a means for producing a magnetic field having a self-inductance, wherein the means for producing the magnetic field includes a coil arrangement;
   a means for sensing a measurement voltage induced in the flowable medium, wherein the means for sensing the measurement voltage includes at least two diametrically arranged measuring electrodes;
   an operating circuit adapted to apply an operating signal on the coil arrangement,
      wherein the operating signal has operating signal parameters,
      wherein the operating signal is a voltage curve varying as a function of time,
      wherein the voltage curve is divided into time intervals,
      wherein a sign of the voltage curve alternates in successive time intervals, and
      wherein the time intervals include, in each case, a first subinterval in which a first voltage constant over the entire first subinterval is applied on the means for producing the magnetic field;
   a measuring circuit adapted to determine a coil electrical current of the coil arrangement; and
   a control circuit adapted to control at least one of the operating signal parameters so that a function dependent on a self-induction value of the self-induction and a coil electrical current value of the coil electrical current does not differ from a predetermined, first desired value.

6. The magneto-inductive flow measurement device as claimed in claim 5, wherein the measuring circuit is adapted to measure the coil electrical current value during the first subinterval, and wherein the controlled operating signal parameter comprises a function dependent on the first voltage or is the first voltage.

7. The magneto-inductive flow measurement device as claimed in claim 5, wherein the time intervals have, in each case, a second subinterval in which a second voltage constant over the second subinterval is applied on the means for producing the magnetic field, wherein the second voltage is greater than the first voltage, wherein in the voltage curve the first subinterval follows the second subinterval, and wherein a duration of the second subinterval is shorter than a duration of the first subinterval.

8. The magneto-inductive flow measurement device as claimed in claim 7, wherein a quotient of the first voltage and the second voltage is constant over the voltage curve, wherein the controlled operating signal parameter comprises the duration of the second subinterval and a function dependent on the first voltage, wherein the duration of the second subinterval is a changeable and controllable variable, wherein the control circuit is adapted so to control the duration of the second subinterval and the function dependent on the first voltage that a control function does not differ from a predetermined, second desired value, and wherein the control function depends on a product of the duration of the second subinterval and the function dependent on the first voltage.

9. The magneto-inductive flow measurement device as claimed in claim 8, wherein a function dependent on the first voltage is inversely proportional to the duration of the second subinterval.

10. The magneto-inductive flow measurement device as claimed in claim 7, wherein the second voltage is constant during the time intervals, wherein the at least one controlled operating signal parameter includes the duration of the second subinterval and a function dependent on the first voltage, wherein the duration of the second subinterval and the function dependent on the first voltage are so controlled that a control function does not differ from a predetermined, second desired value, and wherein the control function depends on a product of the function dependent on the first voltage and the duration of the second subinterval.

11. The magneto-inductive flow measurement device as claimed in claim 10, wherein the coil electrical current in the first subinterval assumes a maximum coil electrical current value, and wherein a value of a quotient of the maximum coil electrical current value and a coil electrical current value ascertained during the first subinterval is constant over the operating signal.

12. The magneto-inductive flow measurement device as claimed in claim 7, wherein the coil electrical current in the first subinterval assumes a maximum coil electrical current value, wherein the at least one controlled operating signal parameter includes the duration of the second subinterval and a function dependent on the first voltage, wherein the control circuit is adapted to control the duration of the second subinterval and the function dependent on the first voltage so that a control function does not differ from a second desired value, wherein the control function depends on a product of the duration of the second subinterval and the function dependent on the first voltage and the maximum coil electrical current value.

* * * * *